United States Patent [19]
Gross

[11] Patent Number: 6,075,483
[45] Date of Patent: *Jun. 13, 2000

[54] METHOD AND SYSTEM FOR ANTENNA BEAM STEERING TO A SATELLITE THROUGH BROADCAST OF SATELLITE POSITION

[75] Inventor: Joel Lloyd Gross, Chandler, Ariz.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/999,154

[22] Filed: Dec. 29, 1997

[51] Int. Cl.$^7$ ................ H04B 7/00; H04Q 7/20
[52] U.S. Cl. .............. 342/367; 342/359.09; 455/427
[58] Field of Search .................. 342/357, 359, 342/352, 357.08, 357.09, 357.1, 357.06, 367; 455/12.1, 427, 25; 701/226

[56] References Cited

U.S. PATENT DOCUMENTS

| | | | |
|---|---|---|---|
| 3,271,565 | 9/1966 | Blackman | 701/226 |
| 5,187,805 | 2/1993 | Bertiger et al. | 342/352 |
| 5,717,404 | 2/1998 | Malla | 342/352 |
| 5,818,385 | 10/1998 | Bartholomew | 342/372 |

FOREIGN PATENT DOCUMENTS

| | | | |
|---|---|---|---|
| 4-178584 | 6/1992 | Japan | 342/352 |

*Primary Examiner*—Gregory C. Issing
*Attorney, Agent, or Firm*—Jeff D. Limon; James E. Klekotka

[57] ABSTRACT

In a satellite communication system, a satellite (FIG. 1, 150) determines its position through the reception of global positioning system signals (180). The satellite (150) then broadcasts its position by way of a wide coverage antenna (152) transmitting a low data rate position broadcast (125). A ground station (110) receives the low data rate position broadcast (125) and directs a narrow beam antenna (120) to the reported position of the satellite (150). The ground station (110) then begins high data rate communications with the satellite (150) through the narrow beam antenna (120).

12 Claims, 4 Drawing Sheets

METHOD AND SYSTEM FOR ANTENNA BEAM STEERING TO A SATELLITE THROUGH BROADCAST OF SATELLITE POSITION

FIELD OF THE INVENTION

This invention relates to communication systems and, more particularly, to a method and system for antenna beam steering to a satellite through broadcast of satellite position information.

BACKGROUND OF THE INVENTION

In a wideband satellite communication system, a narrow beam antenna is used to transmit information between an individual subscriber unit ground station and a satellite in orbit about the Earth. The need for a narrow beam antenna is dictated by the link budget requirements for the wideband satellite-to-ground radio frequency link. In a narrow beam satellite communication system, an excessive amount of time can be expended in executing a search pattern in order to point the beam towards a satellite whose position varies as a function of time. In a low earth orbit communication satellite system, where the motion of a satellite relative to a ground station suggests that the satellite will be visible for only a few minutes, it is especially advantageous to direct a narrow beam antenna to the precise direction of a satellite in a very short period of time. Additionally, as the satellite moves in its orbit, the ground station narrow beam antenna must be constantly redirected to the position of the satellite in order to ensure uninterrupted communication.

In a currently proposed communication satellite system architecture, the ground station narrow beam antenna is directed toward the satellite based on predictions of the satellite position. Thus, the ground station must be apprised of the satellite position in advance of the satellite becoming visible in order to acquire and remain in contact with the satellite. In a wideband satellite communication system comprising a constellation of non-geostationary satellites, the ephemeris of the satellites can be extensive. Additionally, changes in the satellite velocity and direction vector caused by atmospheric drag, solar wind, or other phenomena, cause the ephemeris to require periodic updating. Even with such updating, the ground station may still require substantial time to search for the satellite using a narrow antenna beam.

Therefore, what is needed, are a method and system for antenna beam steering to the satellite through the broadcast of the satellite position. Such a system would greatly reduce the search time for a narrow beam to acquire the communication satellite.

DESCRIPTION OF THE PREFERRED EMBODIMENTS

A method and system for beam steering through the broadcast of satellite position provide a rapid means of directing a narrow beam antenna to the direction of the desired satellite. The use of the invention enables the user to quickly establish a link to a communication satellite without requiring the earth based narrow beam antenna to search for the desired satellite. Additionally, as the satellite moves relative to the earth based narrow beam antenna, it can continue to be tracked without requiring sophisticated tracking electronics. Further, when the satellite passes over the horizon, the earth-based station can quickly acquire the next satellite thus ensuring virtually uninterrupted service from the satellite communication system.

Figure 1:
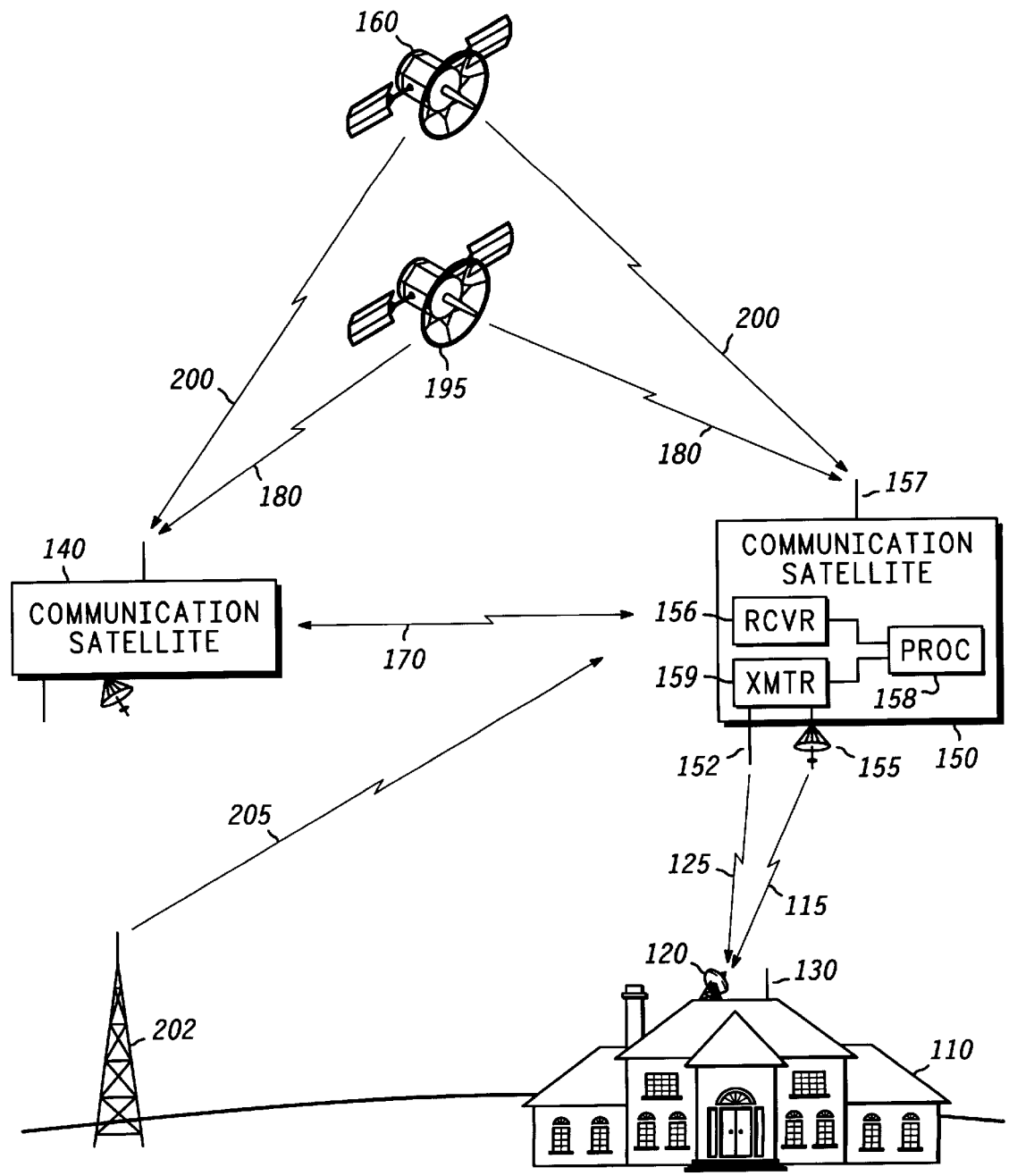
FIG. 1 illustrates a system for antenna beam steering to a satellite through the broadcast of the satellite position in accordance with a preferred embodiment of the invention.

FIG. 1 illustrates a system for antenna beam steering to a satellite through the broadcast of the satellite position in accordance with a preferred embodiment of the invention. In FIG. 1, ground station 110 is equipped with the hardware and software needed to conduct communications with satellite 150. In addition to data reception and transmission capabilities, ground station 110 also possesses narrow beam antenna 120 and wide coverage antenna 130. Narrow beam antenna 120 provides the radiating and receiving structure through which data communications to satellite 150 is enabled. Though shown in FIG. 1 as a relatively permanent structure, ground station 110 can be a fixed earth station, semi-permanent earth station, or a completely mobile earth station.

In a preferred embodiment, satellite 150 is a component of a communication system comprising a constellation of satellites in a geostationary orbit or a non-geostationary orbit designed to communicate with a variety of subscriber equipment such as ground station 110. Satellite 150 provides a node of the communications infrastructure provided by the communication satellite constellation. Satellite 150 communicates with ground station 110 through narrow beam antenna 155, as well as wide coverage antenna 152. Satellite 150 also comprises radiation sensor 157, as well as receiver 156, processor 158, and transmitter 159. The receiver, processor, and transmitter provide well-known mechanisms for conducting communication with systems external to the satellite as well as for executing onboard processing.

Radiation sensor 157 can be designed to receive signals in any portion of the electromagnetic spectrum. Thus, radiation sensor 157 can be an antenna designed to receive signals in the radio frequency, microwave, or millimeter wave spectrum. Additionally, radiation sensor 157 can be a sensor designed to receive signals in the optical or infrared wavelengths. Radiation sensor 157 can also be designed to receive signals from geostationary satellite 160 through external signal 200 or to communicate with adjacent similar satellite 140 through intersatellite link 170. In a preferred embodiment, radiation sensor 157 is an antenna designed to receive one or more radio frequency signals from satellites which comprise a global positioning system.

In an alternative embodiment of the invention, radiation sensor 157 may be an antenna designed to receive one or more radio signals from earth-based transmitter 202 through radio signal 205. Radio signal 205 can represent a signal from a well-known navigation system such as very high frequency omnidirectional ranging, distance measuring equipment, or tactical air navigation system. In another alternative embodiment, radiation sensor 157 is designed to receive radio frequency signals which employ other modulation techniques such as amplitude modulation, frequency modulation, or phase shift keying. The only requirement of radiation sensor 157 is that it be capable of receiving electromagnetic signals, such as those described above, from which position information can be derived. This information can be derived either through demodulation or other extraction of position, direction, or timing information which has been purposely placed onto a carrier signal, or through the direct analysis of an electromagnetic signal through techniques such as phase front homing and interferometry.

In a preferred embodiment, navigation information from global positioning system satellite 195 is conveyed through global positioning system signal 180 to radiation sensor 157. Receiver 156 converts the received signal into a format which allows processor 158 to extract position information. Other satellites similar to global positioning system satellite 195 can also convey navigation information through signals similar to global positioning system signal 180 in order to enable processor 158 to more accurately determine the current position of satellite 150. In a preferred embodiment, signals from at least three global positioning satellites are conveyed to satellite 150, but signals from a greater or lesser number of satellites can be used to obtain position information with varying degrees of precision.

When the position of satellite 150 has been determined by processor 158, it is conveyed through transmitter 159 to wide coverage antenna 152. Wide coverage antenna 152 then broadcasts the satellite position by way of low data rate position broadcast 125 for reception by wide coverage antenna 130. Upon reception of the satellite position by ground station 110 through wide coverage antenna 130, narrow beam antenna 120 is directed toward the position of satellite 150.

In a preferred embodiment, wide coverage antenna 152 and transmitter 159 are designed to operate at low data rates. Thus, low data rate position broadcast 125 from wide coverage antenna 152 to wide coverage antenna 130 possesses a positive satellite-to-ground link margin.

Although wide coverage antenna 152 is shown as an omnidirectional monopole antenna, this is not intended to be limiting in any way. As it is generally desirable to radiate as little energy behind the satellite as is possible, wide coverage antenna 152 may consist of an antenna array designed to produce spot beams which illuminate only the terrestrial coverage area. In this manner the radiated power from wide coverage antenna 152 can be utilized efficiently. Wide coverage antenna 130 is a receive-only version of wide coverage antenna 152.

Upon acquisition of satellite 150 by narrow beam antenna 120, data can be exchanged between narrow beam antennas 155 and 120 through high bandwidth user information signal 115. As information is being exchanged between satellite 150 and ground station 110, satellite 150 continues to transmit low data rate position broadcast 125 thus allowing other ground stations similar to ground station 110 to acquire satellite 150. Additionally, the position information can also be embedded into high bandwidth user information signal 115. Thus, as satellite 150 moves relative to ground station 110, narrow beam antenna 120 can be constantly redirected toward the current position of satellite 150. This allows virtually uninterrupted service from the communication satellite system represented by satellite 150. Additionally, in the event that high bandwidth user information signal 115 is interrupted, the position of satellite 150 can be quickly reacquired through low data rate position broadcast 125.

In a preferred embodiment, a predicted location of satellite 150 at a future time is also contained in low data rate position broadcast 125. This provides another method for narrow beam antenna 120 to reacquire satellite 150 in the event of a momentary loss of service caused by a physical obstruction between satellite 150 and ground station 110. In the event of a physical obstruction momentarily interrupting service between satellite 150 and ground station 110, narrow beam antenna 120 can be directed to the predicted location of satellite 150 until the satellite reappears at that location.

In a preferred embodiment, satellites 140 and 150 communicate through intersatellite link 170. This allows satellite 140 to report its current and predicted position to satellite 150. Thus, low data rate position broadcast 125 also comprises the current and predicted position of adjacent satellite 140. This is useful in directing narrow beam antenna 120 to the location of the next satellite when satellite 150 moves beyond the horizon. In this manner, a plurality of low earth orbit satellites can provide virtually uninterrupted data communication service with ground station 110 through the successive handover of high bandwidth user information signal 115 from satellite 150 to satellite 140 and to other satellites which comprise the communication system as each becomes visible by ground station 110.

Figure 2:
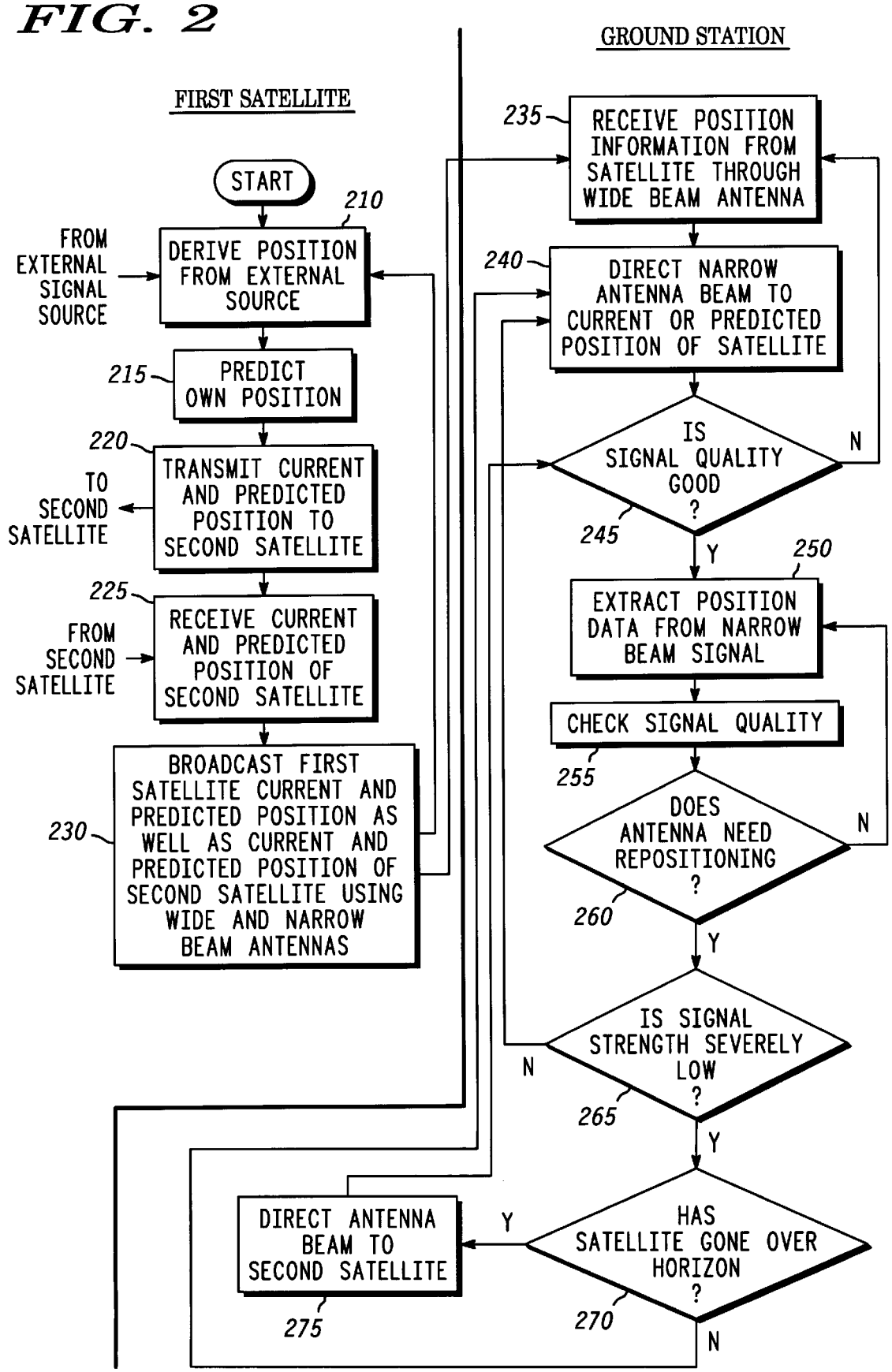
FIG. 2 illustrates a method for antenna beam steering to a satellite through the broadcast of the satellite position in accordance with a preferred embodiment of the invention.

FIG. 2 illustrates a method for antenna beam steering to a satellite through the broadcast of the satellite position in accordance with a preferred embodiment of the invention. In step 210, the satellite derives its position from electromagnetic signals which originate external to the satellite. As previously mentioned, these signals can occupy any portion of the electromagnetic spectrum such as radio frequency, optical, or infrared. Additionally, the signals can be specifically designed to carry navigation information, or they may contain other types of unrelated information such as that conveyed by conventional broadcast television and radio stations. In step 215, the satellite utilizes the information contained in the electromagnetic signal or the characteristics of the electromagnetic signal itself to predict the position of the satellite at a future time.

In step 220, the current and predicted satellite positions are transmitted to a second satellite within the constellation. In step 225, current and predicted positions of a second satellite are received by the first satellite by way of an intersatellite crosslink. In step 230, the first satellite's current and predicted position, as well as the current and predicted position of a second satellite, are transmitted using both wide and narrow beam antennas. The first satellite then returns to step 210 to update its position based on the external signals.

In step 235, the ground station receives position information from the first satellite through a wide coverage antenna. In step 240, the narrow beam antenna is directed to the first satellite. In step 245, the ground station evaluates the quality of the signal present in the narrow antenna beam from the first satellite. If the signal is not of good quality, then the ground station returns to step 235 to receive a new position of the first satellite through the wide coverage antenna. If the signal quality is adequate, the ground station proceeds to step 250 where the position data is extracted from the data stream of the narrow beam signal.

In step 255, the quality of the narrow beam signal is evaluated. In step 260, the ground station determines if the narrow beam antenna should be repositioned. If the narrow beam antenna does not require repositioning, then step 250 is executed and the ground station waits for updated satellite position information. If the decision of step 260 determines that the narrow beam antenna does need repositioning, then step 265 is executed. In step 265, a decision is made as to the extent of the degradation of the signal strength of the narrow beam antenna.

In the case of modest signal degradation, it is anticipated that small corrections in the direction vector of the narrow beam antenna will be sufficient to return the received signal strength to an acceptable level. However, if the degradation is moderate, then step 240 is executed wherein the narrow beam is adjusted to point to a new location. The ground station then executes step 245 to determine if the corrections of step 240 were sufficient to raise the signal strength to an acceptable level.

If in step 265, it is determined that the signal strength of the narrow beam link is severely low, then step 270 is executed. In step 270, a decision is made as to whether the satellite is passing over the horizon. If the satellite is passing over the horizon, then step 275 is executed. In step 275, the narrow beam antenna is redirected toward the second satellite. Step 245 is then executed to determine if the received signal strength from the second satellite is adequate.

If the decision of step 270 determines that the satellite has not passed over the horizon, then the ground station returns to step 240 wherein the narrow beam antenna is directed to a predicted position of the first satellite. Step 240 may be executed after the ground station has waited for a predetermined period of time. Concurrent with the execution of step 240, the ground station can also execute step 235 wherein the position of the first satellite is received through the wide coverage antenna.

Figure 3:
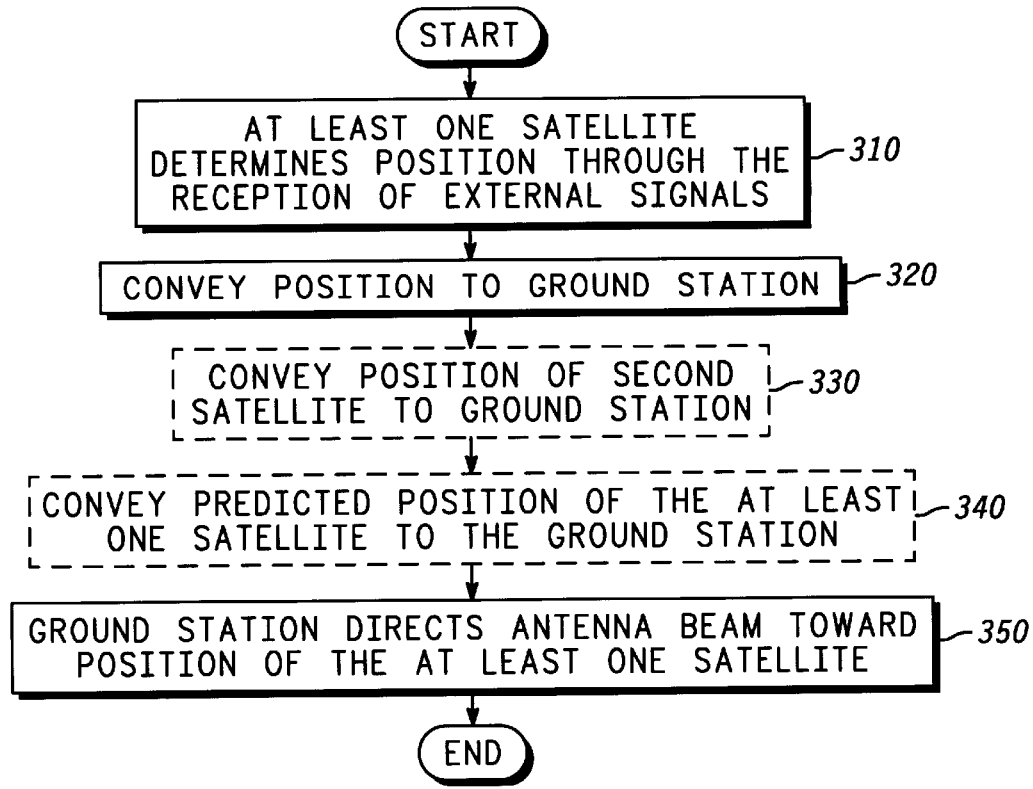
FIG. 3 illustrates a second method for antenna beam steering to a satellite through the broadcast of the satellite position in accordance with an alternative embodiment of the invention.

FIG. 3 illustrates a second method for antenna beam steering to a satellite through the broadcast of the satellite position in accordance with an alternative embodiment of the invention. In step 310, at least one satellite determines its position through the reception of external signals. In step 320, the at least one satellite conveys the position to a ground station. Optional step 330 comprises the satellite conveying a position of a second satellite to the ground station. Optional step 340 comprises the at least one satellite conveying a predicted position of the at least one satellite to the ground station. In step 350, the ground station directs an antenna beam toward the position of the at least one satellite.

Figure 4:
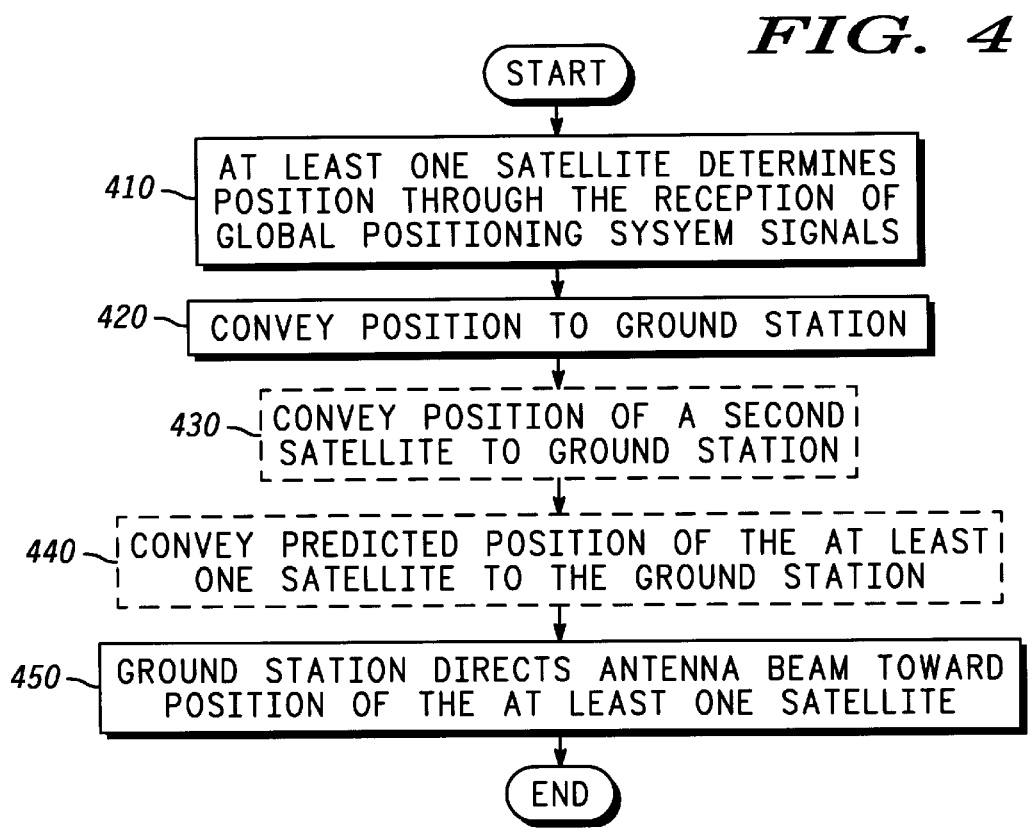
FIG. 4 illustrates a third method for antenna beam steering to a satellite through the broadcast of the satellite position in accordance with an alternative embodiment of the invention.

FIG. 4 illustrates a third method for antenna beam steering to a satellite through the broadcast of the satellite position in accordance with an alternative embodiment of the invention. In step 410 at least one satellite determines its position through the reception of signals from a global positioning system. In step 420, the at least one satellite conveys its position to a ground station. Optional step 430 comprises the at least one satellite conveying the position of a second satellite to the ground station. Optional step 440 comprises the satellite conveying a predicted position of the at least one satellite to the ground station. In step 450, the ground station directs an antenna beam toward the position of the at least one satellite.

Figure 5:
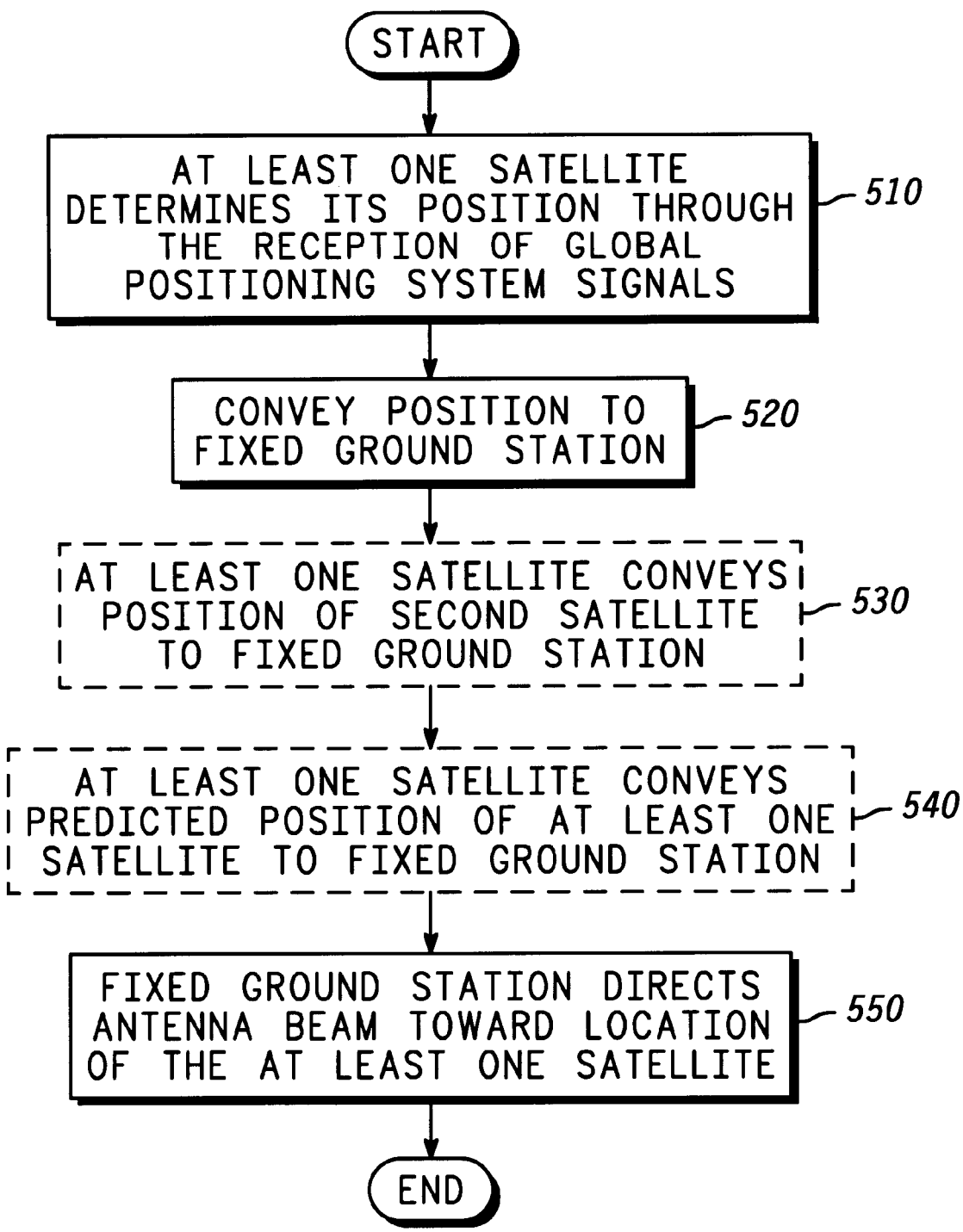
FIG. 5 illustrates a fourth method for antenna beam steering to a satellite through the broadcast of the satellite position in accordance with an alternative embodiment of the invention.

FIG. 5 illustrates a fourth method for antenna beam steering to a satellite through the broadcast of the satellite position in accordance with an alternative embodiment of the invention. In step 510 at least one satellite determines its position through the reception of global positioning system signals. In step 520, the at least one satellite conveys its position to a fixed ground station through a wide coverage antenna. Optional step 530 comprises the at least one satellite conveying the position of a second satellite to the fixed ground station. Optional step 540 comprises the at least one satellite conveying a predicted position of the at least one satellite to the fixed ground station. In step 550 the fixed ground station directs a narrow beam antenna toward the position of the at least one satellite.

The herein disclosed method and system for antenna beam steering through the broadcast of satellite position quickly directs a narrow beam antenna to the location of a communication satellite. Through the use of the invention, a ground station can quickly establish contact with a communication satellite without needing to search for the desired satellite. When the satellite goes out of view, the ground station can quickly acquire the next satellite and thus obtain virtually uninterrupted service from the satellite communication system.

Accordingly, it is intended by the appended claims to cover all modifications of the invention that fall within the true spirit and scope of the invention.

What is claimed is:

1. In a satellite communication system comprising at least one satellite, said at least one satellite being capable of determining a position through reception of external signals, said satellite communication system also comprising at least one ground station, a method for said at least one ground station to direct a narrow antenna beam toward said at least one satellite, said method comprising the steps of:

(a) said at least one satellite determining its position through reception of said external signals;

(b) said at least one satellite broadcasting, using a low data rate signal, said position through a wide coverage antenna;

(c) said at least one ground station directing said narrow antenna beam toward said position in response to said broadcasting step; and (d) said at least one satellite communicating with said at least one ground station using a high bandwidth user information signal communicated between said at least one satellite and said ground station using said narrow antenna beam.

2. The method claimed in claim 1, wherein step (b) comprises the step of said at least one satellite broadcasting a position of a second satellite through said wide coverage antenna.

3. The method claimed in claim 1, wherein said at least one satellite is in a non-geostationary orbit.

4. The method claimed in claim 1, wherein step (b) comprises the step of said at least one satellite broadcasting a predicted position of said at least one satellite through said wide coverage antenna.

5. In a satellite communication system comprising at least one satellite, said at least one satellite being capable of determining a position through reception of external signals from a global positioning system, said satellite communication system also comprising at least one ground station, a method for said at least one ground station to direct a narrow antenna beam toward said at least one satellite, said method comprising the steps of:

(a) said at least one satellite determining its position through reception of said external signals;

(b) said at least one satellite broadcasting, using a low data rate signal, said position through a wide coverage antenna;

(c) said at least one ground station directing said narrow antenna beam toward said position in response to said broadcasting step; and (d) said at least one satellite communicating with said at least one ground station using a high bandwidth user information signal transmitted by way of said narrow antenna beam.

6. The method claimed in claim 5, wherein step (b) comprises the step of said at least one satellite broadcasting a position of a second satellite through said wide coverage antenna.

7. The method claimed in claim 5, wherein said at least one satellite is in a non-geostationary orbit.

8. The method claimed in claim 5, wherein step (b) comprises the step of said at least one satellite broadcasting a predicted position of said at least one satellite through said wide coverage antenna.

9. In a satellite communication system comprising at least one satellite, said at least one satellite being capable of determining a position through reception of signals which originate from a global positioning system, said satellite communication system also comprising at least one fixed ground station, a method for said at least one fixed ground station to direct a narrow antenna beam toward said at least one satellite, said method comprising the steps of:

(a) said at least one satellite determining a position through reception of said signals;

(b) said at least one satellite broadcasting, using a low data rate signal, said position through a wide coverage antenna;

(c) said at least one fixed ground station directing said narrow beam antenna toward said position in response to said broadcasting step; and (d) said at least one satellite communicating with said at least one ground station using a high bandwidth user information signal communicated through said narrow antenna beam.

10. The method claimed in claim 9, wherein step (b) comprises the step of said at least one satellite broadcasting the position of a second satellite through said wide coverage antenna.

11. The method claimed in claim 9, wherein said at least one satellite is in a non-geostationary orbit.

12. The method claimed in claim 9, wherein step (b) comprises the step of said at least one satellite broadcasting a predicted position of said at least one satellite through said wide coverage antenna.

* * * * *